(12) United States Patent
Bokhorst et al.

(10) Patent No.: US 10,577,959 B2
(45) Date of Patent: Mar. 3, 2020

(54) SEAL ARRANGEMENT FOR A MID TURBINE FRAME OF A GAS TURBINE

(71) Applicant: MTU Aero Engines AG, Munich (DE)

(72) Inventors: Willem Bokhorst, Hebertshausen (DE); Fabian Moritz, Munich (DE)

(73) Assignee: MTU Aero Engines AG, Munich (DE)

( * ) Notice: Subject to any disclaimer, the term of this patent is extended or adjusted under 35 U.S.C. 154(b) by 7 days.

(21) Appl. No.: 15/704,704

(22) Filed: Sep. 14, 2017

(65) Prior Publication Data

US 2018/0080333 A1 Mar. 22, 2018

(30) Foreign Application Priority Data

Sep. 22, 2016 (DE) .................. 10 2016 218 239

(51) Int. Cl.
*F16J 15/34* (2006.01)
*F01D 11/00* (2006.01)
*F01D 9/06* (2006.01)
*F01D 25/18* (2006.01)
*F01D 25/16* (2006.01)
*F16C 33/74* (2006.01)

(52) U.S. Cl.
CPC ............ *F01D 11/003* (2013.01); *F01D 9/065* (2013.01); *F01D 25/18* (2013.01); *F16J 15/3464* (2013.01); *F01D 25/16* (2013.01); *F16C 33/74* (2013.01)

(58) Field of Classification Search
CPC . F16J 15/32; F16J 15/34; F16J 15/441; F05D 2240/55; F05D 2240/58; F01D 11/003; F01D 11/005; F01D 25/186
See application file for complete search history.

(56) References Cited

U.S. PATENT DOCUMENTS 3,970,321 A * 7/1976 Dechavanne ........ F16J 15/3208
277/556
4,729,569 A * 3/1988 Muller ................... F16J 15/164
277/584

(Continued)

FOREIGN PATENT DOCUMENTS

DE 6807544 U 4/1969
DE 1476791 A1 10/1969

(Continued)

OTHER PUBLICATIONS

"Engineer's Handbook of Piston Rings, Seal Rings, Mechanical Shalt Seals,", Koppers Company, Inc.—Metal Products Division, Baltimore, Maryland, 9th edition, c1975, pp. 76-85.

(Continued)

*Primary Examiner* — Kristina R Fulton
*Assistant Examiner* — L. Susmitha Koneru
(74) *Attorney, Agent, or Firm* — Barlow, Josephs & Holmes, Ltd.

(57) ABSTRACT

The seal arrangement for a mid turbine frame of a gas turbine, especially an aircraft gas turbine, includes a tubular fluid duct, especially an oil duct, which extends along an axial direction, a bearing sleeve surrounding the fluid duct radially outside and in the peripheral direction, and at least one seal ring arranged between fluid duct and bearing sleeve in the radial direction, this ring being arranged around the fluid duct. The seal ring is taken up at least partly in a groove provided in the bearing sleeve.

9 Claims, 4 Drawing Sheets

(56) References Cited

U.S. PATENT DOCUMENTS

| | | | |
|---|---|---|---|
| 8,100,407 B2* | 1/2012 | Stanton | F16J 15/183 166/105 |
| 8,398,124 B2* | 3/2013 | Bennett | F16L 19/065 285/389 |
| 2007/0025835 A1* | 2/2007 | Gockel | F01D 25/125 415/110 |
| 2008/0017814 A1* | 1/2008 | Berckenhoff | E21B 33/061 251/1.3 |
| 2009/0289452 A1* | 11/2009 | Bennett | F16L 19/065 285/339 |
| 2011/0085895 A1 | 4/2011 | Durocher | |
| 2012/0328418 A1* | 12/2012 | Yang | F01D 25/186 415/170.1 |
| 2013/0287552 A1* | 10/2013 | House | F01D 11/003 415/170.1 |
| 2014/0008873 A1* | 1/2014 | Inoue | F16J 15/441 277/422 |

FOREIGN PATENT DOCUMENTS

| | | |
|---|---|---|
| DE | 4237886 A1 | 3/1994 |
| DE | 112012005819 T5 | 12/2014 |
| DE | 112013006254 T5 | 10/2015 |
| EP | 0818607 A2 | 1/1998 |
| EP | 2261468 A1 | 12/2010 |
| EP | 2949938 A1 | 12/2015 |
| EP | 3118418 A1 | 1/2017 |
| WO | 2014158294 A2 | 10/2014 |
| WO | 2015065731 A1 | 5/2015 |

2014/0010649 A1  1/2014  Farah et al.

OTHER PUBLICATIONS

"Mechanical Seals", E. Mayer, ILiffe Books, London, England, First Edition 1966, Second Edition 1972, p. 5.

* cited by examiner

SEAL ARRANGEMENT FOR A MID TURBINE FRAME OF A GAS TURBINE

BACKGROUND OF THE INVENTION

The present invention relates to a seal arrangement for a mid turbine frame of a gas turbine, especially an aircraft gas turbine, with a tubular fluid duct, especially an oil duct, which extends along an axial direction, a bearing sleeve surrounding the fluid duct radially outside and in the peripheral direction, and at least one seal ring arranged between fluid duct and bearing sleeve in the radial direction, this seal ring being arranged around the fluid duct. By the axial direction is meant here the principal direction of extension of the fluid duct.

In a mid turbine frame, oil ducts are led through struts in order to supply a bearing, the struts extending through an annular channel which conveys hot gas. These ducts comprise a so-called fixed bearing and a so-called floating bearing. The floating bearing of the ducts is designed so that movements in the axial direction of the tubular ducts are permitted during operation of the gas turbine. In the region of the floating bearing, the sealing is produced by way of a piston ring, which is provided on the outside of the duct, especially in a groove arranged on the duct. This piston ring of rather small dimension in the axial direction of the duct not only provides sealing, but also transmits forces during operation orthogonally to the axial direction of the tubular ducts. In this process, wear may occur between piston ring, duct, and external retainer, called here the bearing sleeve. In particular, fretting may occur at the contact sites between piston ring, duct, and bearing sleeve during operation of the gas turbine when the oil ducts and/or the piston ring itself, being generally designed as a slit ring, begin to vibrate.

SUMMARY OF THE INVENTION

The object of the invention is to provide a seal arrangement with which the above drawbacks can be avoided.

To achieve this object, it is proposed according to the invention that the seal ring is taken up at least partly in a groove provided in the bearing sleeve. This makes it possible for the seal ring to sink down into the groove in the bearing sleeve during movements which occur in operation, without the seal ring serving to transmit forces.

The bearing sleeve may have an axially front sleeve section and a separate axially rear sleeve section, which in the assembled state of the seal arrangement lie against one another in the axial direction. In this case, the groove may be formed by the axially front sleeve section and the axially rear sleeve section. Such a two-piece design enables an easy assembly and also an easy replacement of the seal arrangement.

The seal ring may lie against a radial outer side of the fluid duct and have a ring spacing from a bottom of the groove lying further outside radially. The fluid duct may have a sleeve spacing from the axially front sleeve section and from the axially rear sleeve section. It is preferable here for the ring spacing to be greater than the sleeve spacing. Upon movements or thermal expansions, thanks to the smaller sleeve spacing the fluid duct and the bearing sleeve lie directly against one another. The seal ring will be moved into the groove, but does not touch the groove bottom on account of the larger ring spacing. Thus, the seal ring can be prevented from transmitting the acting forces. Thanks to the fluid duct and bearing sleeve lying against one another, the acting forces are distributed over a larger surface area, so that the force acting according to unit of surface area is less. This leads on the whole to less wear.

The axially front sleeve section and/or the axially rear sleeve section may be braced in the axial direction and radially outside against an uptake sleeve. The uptake sleeve may have a first retaining device and a second retaining device, between which the axially front sleeve section and the axially rear sleeve section are fitted, preferably the first retaining device being formed by a retaining ring bracing the axially front sleeve section, which is connected to the uptake sleeve, and also preferably the second retaining device is formed by a radial projection bracing the axially rear sleeve section, which is formed in the uptake sleeve.

The seal arrangement may form an uptake similar to a plain bearing, enabling movements of the fluid duct in the axial direction.

Moreover, the invention relates to a mid turbine frame of a gas turbine, especially an aircraft gas turbine, with an annular channel carrying hot gas and at least one bearing situated radially inside to support at least one shaft of the gas turbine, wherein the mid turbine frame has a plurality of struts supporting at least one bearing, these struts extending from the bearing through the annular channel, a seal arrangement as described above being taken up in at least one of the struts.

In such a mid turbine frame, the seal arrangement may be arranged on the side of the strut facing the bearing. This means that the seal arrangement is arranged radially inside with reference to the machine axis of the gas turbine. Alternatively, however, the seal arrangement may also be arranged on the side of the strut facing away from the bearing, i.e., radially outside with reference to the machine axis of the gas turbine.

BRIEF DESCRIPTION OF THE DRAWING FIGURES

The invention shall be described below as an example and not in limiting manner with reference to the appended figures.

In a heavily simplified schematic overview, FIG. 1A shows a gas turbine, wherein one possible arrangement of a seal arrangement is explained.

FIGS. 3A and 3B show an enlargement of the seal arrangement roughly corresponding to the broken-line excerpt III of FIG. 2, wherein FIG. 3A shows a state of rest and FIG. 3B an operational state.

DESCRIPTION OF THE INVENTION

Figure 1A:
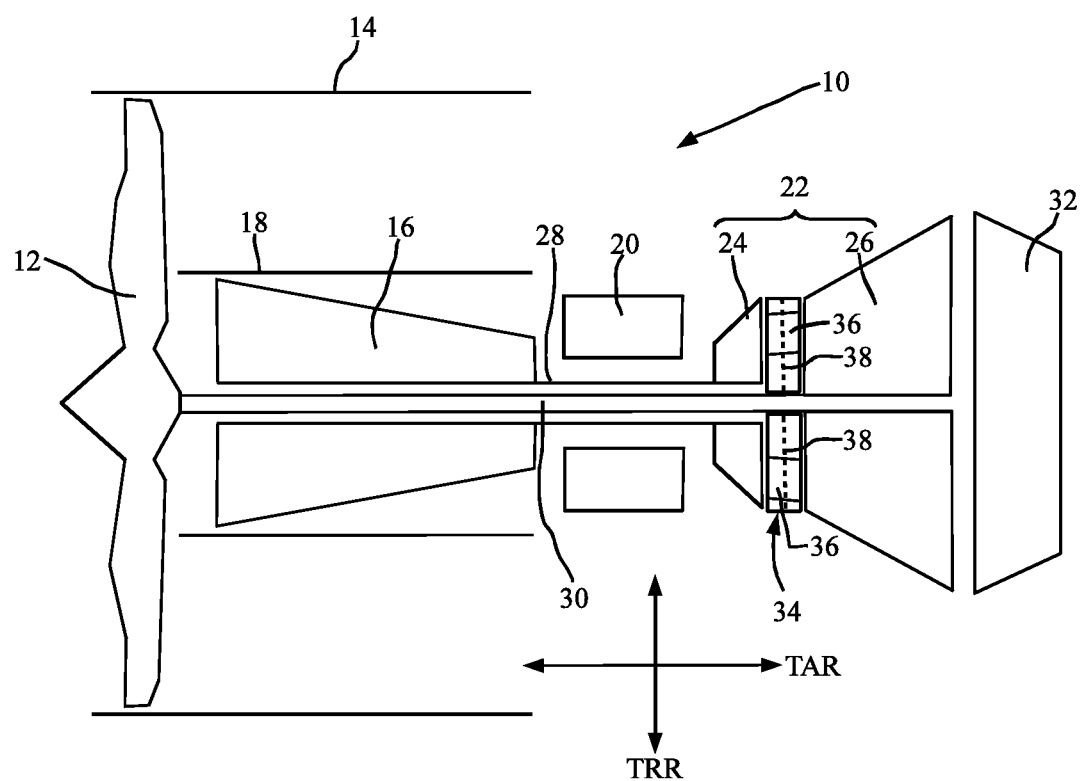
FIG. 1B shows a prior art seal arrangement in a simplified cross-sectional representation.

Heavily simplified and schematically FIG. 1A shows the layout of a gas turbine 10, especially an aircraft gas turbine (e.g., a turbofan engine). The gas turbine 10 comprises a fan 12, which is surrounded by a roughly indicated casing 14. In an axial direction TAR of the gas turbine 10, next to the fan 12 is connected a compressor 16, which is taken up in a roughly indicated inner housing 18, and may be designed as a single-stage or multistage type. Next to the compressor 16 is connected the combustion chamber 20. Hot gas flowing out from the combustion chamber 20 then flows through the adjoining turbine 22, which may be designed as a single-stage or multi-stage type. In the present example, the turbine 22 comprises a high-pressure turbine 24 and a low-pressure turbine 26. A hollow shaft 28 connects the high-pressure turbine 24 to the compressor 16, especially a high-pressure compressor, so that they rotate together. Another interior shaft 30 connects the low-pressure turbine 26 to the fan 12 and optionally to a low-pressure compressor, which is not shown here, so that these rotate together. A thrust nozzle 32 may be connected to the turbine 22.

In the example shown, between the high-pressure turbine 24 and the low-pressure turbine 26 there is arranged a mid turbine frame 34, which is arranged about the shafts 28, 30. In its radially outer region 36, an annular channel, the mid turbine frame receives a flow of hot exhaust gases from the high-pressure turbine 24. Through this annular channel, extending in the radial direction of the turbine TRR, are struts 38, which are shown schematically here as broken lines, and which serve to brace the shafts 28, 30. The struts 38 are connected, radially outside, to additional load-bearing structures of the gas turbine, which are not shown here. Fluid ducts, especially oil ducts, are provided in the struts 38 in order to be able to supply oil to the bearing region of the shafts 28, 30.

Figure 1B:
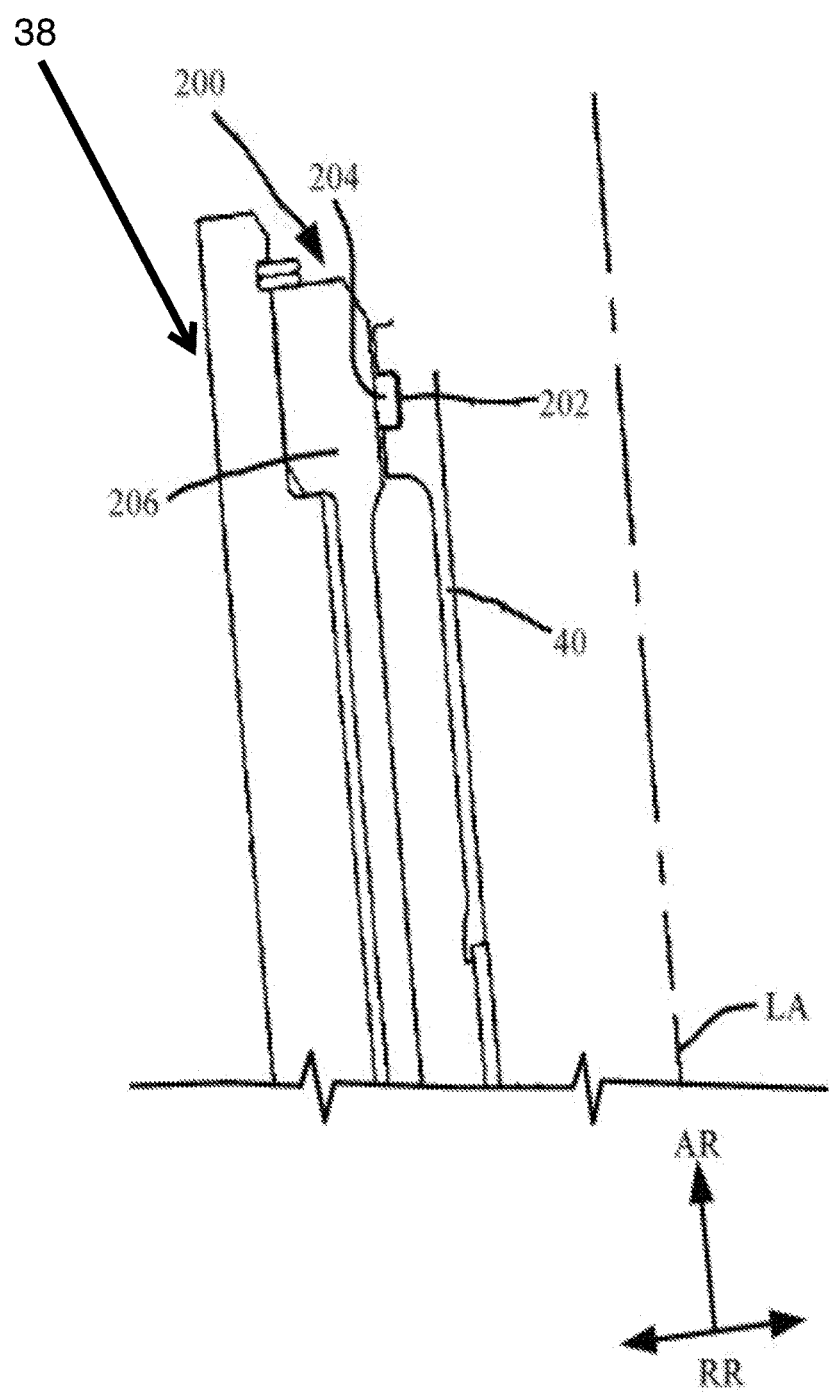

FIG. 1B shows a fluid duct 40 which may be taken up in a strut 38. The fluid duct 40 is substantially tubular in form and extends along an axial longitudinal direction AR. This axial direction AR referred to the fluid duct 40 corresponds substantially to the radial direction TRR with reference to the machine axis of a gas turbine (FIG. 1A). The invention is described below with reference to the directional indications referred to the axial direction AR of the fluid duct 40. In addition, in this case, FIG. 1A shows the radial direction RR of the fluid duct 40.

In FIG. 1B, referred to a longitudinal axis LA of the fluid duct 40, which is parallel to the axial direction AR, there is shown a known seal arrangement 200. In this known seal arrangement 200, a groove 202 is provided on the fluid duct 40, in which a seal ring 204 is taken up. The seal ring 204 lies radially outside of a bearing sleeve 206. The seal ring 204 in a known seal arrangement 200 also serves as a bearing for the fluid duct 40 on the bearing sleeve 206 and thus transmits the forces acting during operation.

Figure 2:
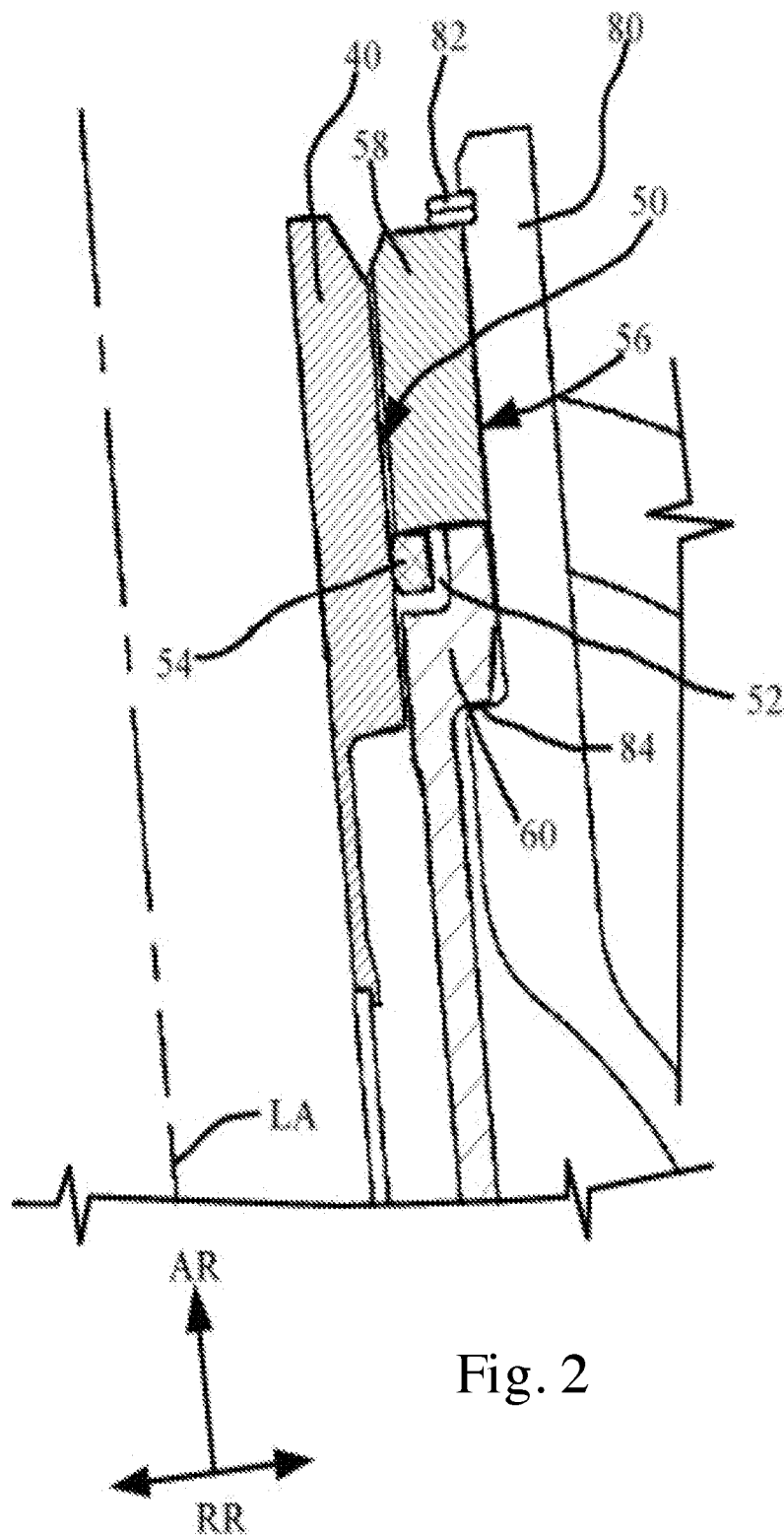
FIG. 2 shows the seal arrangement in a simplified cross-sectional representation.
Figure 3A:
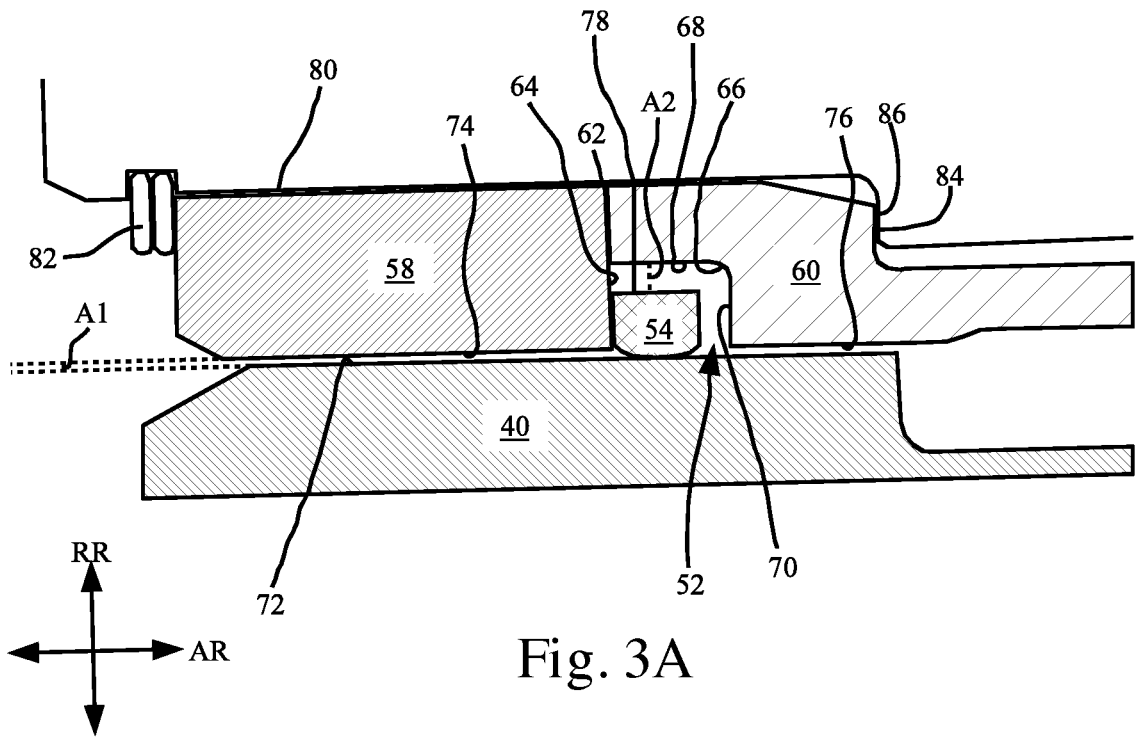

In FIG. 2, referred to the longitudinal axis LA, there is shown one embodiment of a seal arrangement 50 according to the invention. This seal arrangement 50 shall now be explained making reference at the same time to FIGS. 2, 3A and 3B. Here, FIG. 3A represents an enlargement of the seal arrangement 50, which is shown rotated by approximately 90° counterclockwise in relation to FIG. 2.

In the seal arrangement 50, a seal ring 54 is taken up at least partly in a groove 52, this groove 52 being provided in a bearing sleeve 56. The bearing sleeve 56 has an axially front sleeve section 58 and an axially rear sleeve section 60. The two sleeve sections 58, 60 lie against one another in the axial direction AR at reference number 62. The bearing sleeve 56 is thus designed as multipart in this embodiment and has at least two parts.

On the one hand, the groove 52 is formed by an axial rear wall 64 of the front sleeve section 58 and a recess 66 provided in the rear sleeve section 60. A groove bottom 68 at the rear sleeve section 60 and a side wall 70 of the groove 52 lying opposite the rear wall 64 are formed in the recess 66. The side wall 70 can also be called the axial front side of the rear sleeve section 60 in the region of the groove 52. As can be seen from the representation of FIG. 3A, the seal ring 54 is at least partly taken up in the groove 52.

In a state of rest of the gas turbine, a first spacing A1 is present between a radial outer side 72 of the fluid duct 40 and a radial inner side 74 of the front sleeve section 58 or a radial inner side 76 of the rear sleeve section 60. This spacing A1 can also be called the sleeve spacing. A spacing A2 is present between a radial outer side 78 of the seal ring 54 and the groove 52, especially the groove bottom 68. This spacing can also be called the ring spacing. As can be seen from the representation of FIG. 3A, the ring spacing A2 is greater than the sleeve spacing A1.

Figure 3B:
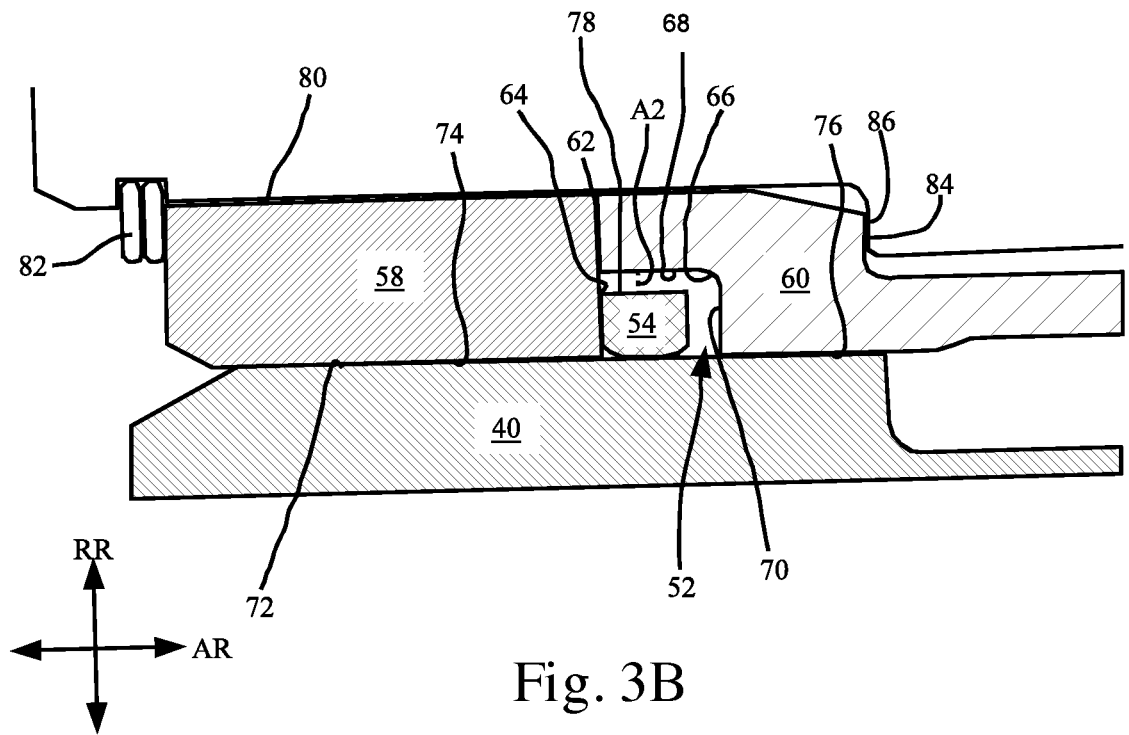

In an operational state, in which the different components move relative to each other due to vibrations and thermal influences in the gas turbine, the case shown in FIG. 3B may occur. The fluid duct 40 comes to lie by its radial outer side 72 against the radial inner sides 74, 76 of the two sleeve sections 58, 60. Forces acting in operation are transmitted in reliable and distributed manner across the abutting sides or surfaces. In such a condition, the seal ring 54 is moved further into the groove 52. The seal ring 54 comes closer to the groove bottom 68. However, the spacing A2 is chosen such that the seal ring 54, even in the operational state, does not come into contact with the groove bottom 68. Thus, no forces are transmitted across the seal ring 54 between fluid duct 40 and bearing sleeve 56. Because of the larger surface area at which the fluid duct 40 and the bearing sleeve 56 lie against one another, the acting forces according to unit of area are less, which leads to a reduction in wear. Moreover, the seal ring 54 is also subject to less wear, because it has no force-transmitting function, such as a seal ring 204 in a known seal arrangement 200 (FIG. 1A).

The seal ring 54 lies radially inside against the outer side 72 of the fluid duct 40. In the axial direction, the seal ring 54 lies against the rear wall 64 of the front sleeve section. Accordingly, the seal ring can manifest its sealing action both in a condition according to FIG. 3A and in a condition according to FIG. 3B.

The bearing sleeve 56 or the front sleeve section 58 and the rear sleeve section 60 are arranged in an uptake sleeve 80 arranged radially outside. The uptake sleeve 80 comprises a first retaining device 82 and a second retaining device 84, between which the axially front sleeve section 58 and the axially rear sleeve section 60 are fitted or clamped or pressed. In the present embodiment, for example, the first retaining device 82 is formed by a retaining ring bracing the axially front sleeve section 58, which is connected to the uptake sleeve 80. The second retaining device 84 is formed, for example, by a radial projection 86 formed in the uptake sleeve 80 and bracing the axially rear sleeve section 60.

Thanks to the bearing sleeve divided into at least two sleeve sections 58, 60, the seal ring 54 no longer needs to be secured to the fluid duct, and especially not be accommodated in a groove there. Hence, the seal ring 54 can be more robust and have a larger cross section. Since, moreover, a contact force is no longer transmitted across the seal ring 54, but instead is transmitted directly from the fluid duct 40 to the bearing sleeve 56, wear on the components can be counteracted. The seal ring 54 can disappear in the groove 52, but, for example, in a state according to FIG. 3A it is only partly taken up in the groove 52. Thanks to the seal arrangement proposed here, an ejecting of the seal ring, which occurs in a conventional seal arrangement 200 (FIG. 1A), can also be prevented. Thus, on the whole, there is produced a highly effective and low-wear seal arrangement for a fluid duct in a strut of a mid turbine frame.

Another advantage of the depicted sample embodiment of the present invention is that, thanks to the two-piece design of the bearing sleeve 56, the seal ring 54 can be more easily mounted and again dismounted or replaced when necessary. As a matter of fact, unlike the embodiment known from the prior art, it is not necessary to pull the fluid duct 40 entirely out from the bearing sleeve 206 for this purpose, in order to reach the groove 202 taking up the seal ring 54, but rather it is enough to loosen the first retaining device 82, which in this exemplary embodiment is formed by at least one retaining ring taken up in a groove in the uptake sleeve 80, and to pull the front sleeve section 58 out from the uptake sleeve 80 in order to gain access to the groove 52 receiving the seal ring 54.

Moreover, the two-piece design of the bearing sleeve 56 also makes it possible to design the seal ring 54, if necessary, as a ring closed about its periphery, which is not possible with the embodiment known from the prior art, at least not when the seal ring is produced from a very elastic material.

It would be appreciated by those skilled in the art that various changes and modifications can be made to the illustrated embodiments without departing from the spirit of the present invention. All such modifications and changes are intended to be covered by the appended claims.

What is claimed is:

1. A seal arrangement for a mid turbine frame of a gas turbine, comprising:
    a tubular fluid duct which extends along an axial direction;
    a bearing sleeve radially surrounding the fluid duct; and
    at least one seal ring arranged between the fluid duct and the bearing sleeve in a radial direction, the ring being arranged around the fluid duct such that the seal ring lies against a radial outer side of the fluid duct;
    wherein the seal ring is taken up at least partly in a groove provided in the bearing sleeve,
    wherein the ring is spaced apart from a bottom face of the groove which is radially outward from the ring thereby defining a ring spacing,
    wherein during operation of the gas turbine no forces are transmitted across the ring between the fluid duct and the bearing sleeve, and
    wherein a radial thickness of the seal ring is less than a radial depth of the groove.

2. The seal arrangement according to claim 1, wherein the bearing sleeve includes an axially front sleeve section and a separate axially rear sleeve section, which in an assembled state of the seal arrangement lie against one another in the axial direction.

3. The seal arrangement according to claim 2, wherein the groove is formed by the axially front sleeve section and the axially rear sleeve section.

4. The seal arrangement according to claim 1,
    wherein a sleeve spacing is defined between the fluid duct and the bearing sleeve in the radial direction, and
    wherein the ring spacing is greater than the sleeve spacing.

5. The seal arrangement according to claim 2, wherein the axially front sleeve section and the axially rear sleeve section are braced in the axial direction against an uptake sleeve, and the uptake sleeve is disposed radially outside the axially front and rear sleeve sections.

6. The seal arrangement according to claim 5, wherein the uptake sleeve has a first retaining device and a second retaining device, between which the axially front sleeve section and the axially rear sleeve section are fitted, wherein the first retaining device is formed by a retaining ring bracing the axially front sleeve section, which is connected to the uptake sleeve, and the second retaining device is formed by a radial projection bracing the axially rear sleeve section and formed in the uptake sleeve.

7. The seal arrangement according to claim 1, wherein the seal forms an uptake to permit movements of the fluid duct in the axial direction.

8. The seal arrangement according to claim 1, wherein the seal arrangement is configured and arranged in a mid turbine frame of a gas turbine; an annular channel conveying hot gas and at least one bearing being situated radially inside to support at least one shaft of the gas turbine; the mid turbine frame having a plurality of struts supporting the at least one bearing, the struts extending from the bearing through the annular channel wherein the seal arrangement is received in at least one of the struts.

9. The seal arrangement according to claim 8, wherein the seal arrangement is arranged on a side of the strut facing the bearing.

* * * * *